June 30, 1953 B. H. KLYCE 2,644,031

SCANNING DEVICE

Filed April 22, 1949 4 Sheets-Sheet 1

INVENTOR.
BATTLE H. KLYCE
BY
Campbell, Brumbaugh, Free & Graves
HIS ATTORNEYS.

June 30, 1953 B. H. KLYCE 2,644,031

SCANNING DEVICE

Filed April 22, 1949 4 Sheets-Sheet 2

INVENTOR.
BATTLE H. KLYCE
BY
Campbell, Brumbaugh, Free & Graves
HIS ATTORNEYS.

June 30, 1953 B. H. KLYCE 2,644,031

SCANNING DEVICE

Filed April 22, 1949 4 Sheets-Sheet 3

INVENTOR.
BATTLE H. KLYCE
BY
Campbell, Brumbaugh, Free & Graves
HIS ATTORNEYS.

June 30, 1953 B. H. KLYCE 2,644,031

SCANNING DEVICE

Filed April 22, 1949 4 Sheets-Sheet 4

INVENTOR.
BATTLE H. KLYCE
BY
Campbell, Brumbaugh, Free & Graves
HIS ATTORNEYS.

Patented June 30, 1953

2,644,031

UNITED STATES PATENT OFFICE 2,644,031

SCANNING DEVICE

Battle H. Klyce, Stamford, Conn., assignor to Time, Incorporated, New York, N. Y., a corporation of New York Application April 22, 1949, Serial No. 89,007

12 Claims. (Cl. 178—5.4)

The present invention relates to scanning devices and more particularly to a new and improved device for scanning an object carrying intelligence thereon to provide electric signals corresponding to said intelligence.

In making reproductions of a subject in color such as a Kodachrome transparency, for example, it has been proposed heretofore to scan the subject to obtain electric currents representing the primary color components of elementary areas of the subject, and to utilize such currents in suitable electronic equipment to produce properly corrected color separation negatives. In systems of this character, scanning has been effected by illuminating the subject and causing each successive elementary area thereof to influence photoelectric cells responsive only to selected primary colors, respectively.

While scanning mechanisms of the above mentioned variety are effective, their noise level is such that relatively intense illumination of the subject is necessary if a satisfactory signal-to-noise ratio is to be obtained. For this reason, they cannot be used effectively to scan original landscapes or other stationary objects which have a relatively low intensity of illumination.

The principal object of the invention, accordingly, is to provide new and improved scanning means which is characterized by an exceptionally low noise level, whereby scanning signals may be obtained that are substantially free from noise.

Another object of the invention is to provide new and improved scanning means of the above character which is capable of furnishing usable signals when used to scan subjects illuminated by light of relatively low intensity such as original landscapes or other stationary objects, for example.

A further object of the invention is to provide new and improved scanning means of the above character which utilizes the energy storage principles of the so-called "iconoscope."

Still another object of the invention is to proview new and improved scanning means of the above character which is adapted to scan a subject at a faster rate than is now attainable with devices of the prior art.

According to the invention, light from elemental areas lying along a scanning line on the subject is directed successively to corresponding elemental areas on the photosensitive surface of a novel form of electronic tube. This produces a scanning line on the latter in which the intelligence received from the subject is temporarily stored in the form of electric charges. The scanning line is swept transversely by an electron beam while the two are moved relatively to one another in the direction of the scanning line, thus producing electric signals representative of the intelligence received from the subject.

Where electric signals representative of primary color components of the subject are desired, the light from each of the elemental areas of the subject may be dispersed to form a spectrum, the several color components of which impinge upon adjacent zones of the photosensitive surface of the tube along a line extending transversely of the scanning line and substantially parallel to the line swept by the electron beam. In this embodiment, a plurality of parallel scanning lines are formed on the photosensitive surface of the tube, and the electron beam is swept transversely across all of them while the said lines and beam are moved relatively to each other longitudinally of the lines.

In a typical form of the invention, a novel electronic tube is employed which incorporates a photosensitive element that is mounted both for movement in two different directions. The subject is scanned optically in any suitable manner, and light from successive elemental areas of the subject is directed to the photosensitive surface of the tube. The latter is moved in synchronism with the optical scanning movement so that the image focussed on its surface is stationary with respect thereto. As the electron image thus formed is being moved in one direction in the tube, it is scanned by an electron beam which is swept across the electron image in a direction normal to the electron image line. As scanning of each electron image line is completed, the photosensitive surface is restored to its initial position, preparatory to scanning the next line.

Additional objects and advantages of the invention will be apparent from the following detailed description of a representative embodiment, taken in conjunction with the accompanying drawings in which.

Figures 1, 1A, 2:
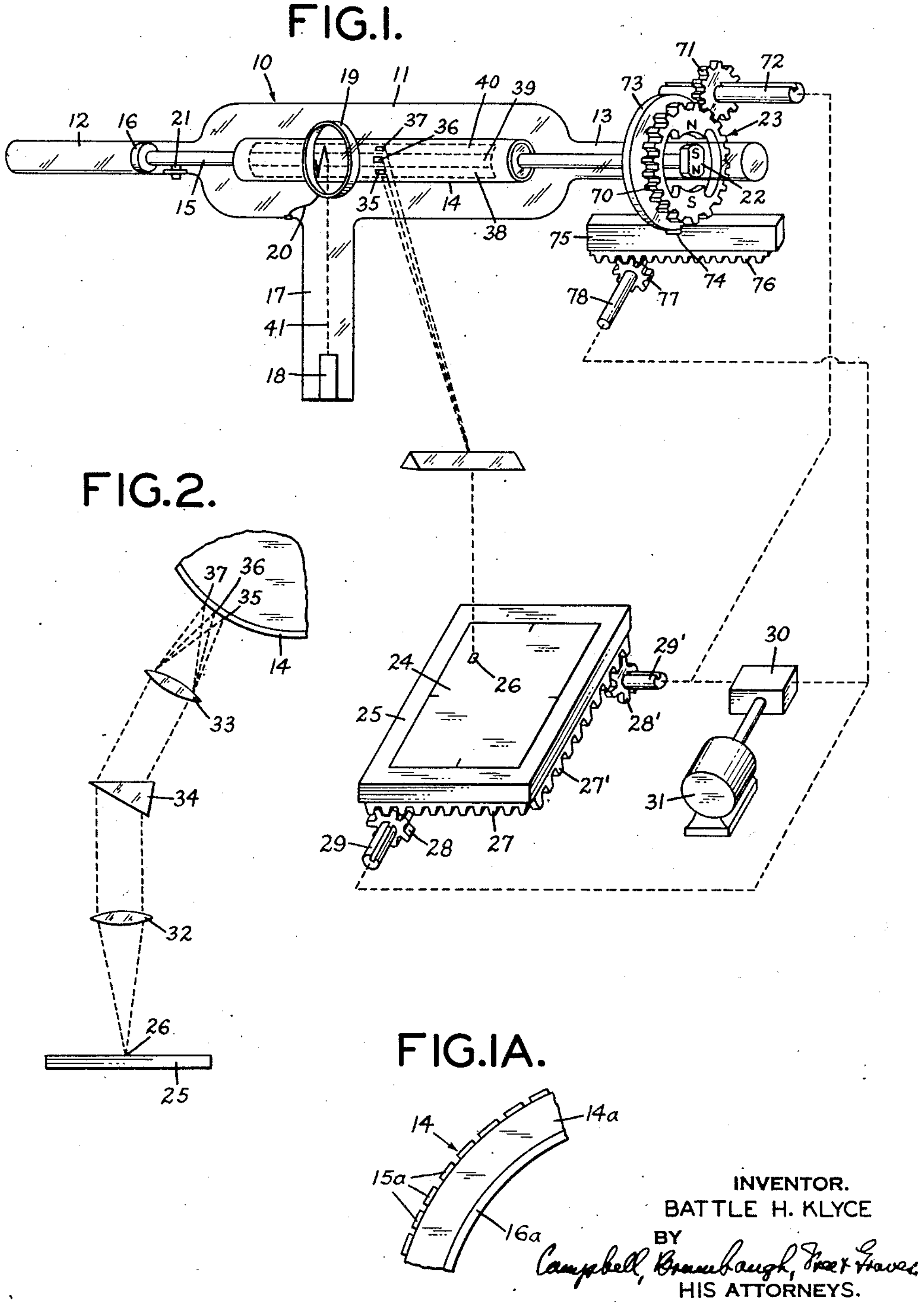
Fig. 1 is a schematic diagram of scanning apparatus constructed according to the invention.
Fig. 1A is a partial end view of the cylindrical mosaic of Fig. 1, illustrating the constructional details thereof.
Fig. 2 illustrates schematically a typical optical system suitable for use with the scanning system shown in Fig. 1.

In a preferred embodiment, the scanning system utilizes a novel form of iconoscope tube. The tube may comprise, for example, a sealed envelope 10 (Figs. 1 and 2) made of glass or other suitable material, having a central, substantially tubular portion 11 of relative large cross-section communicating at its opposite ends with cylindrical portions 12 and 13 of lesser cross-section.

Mounted in the central portion 11 of the tube 10 is a substantially cylindrical mosaic 14 which is formed in essentially the same manner as the flat mosaic now used in the conventional iconoscope tube. As shown in exaggerated form in Fig. 1A, the mosaic 14 may comprise a cylindrical support 14*a* of glass or mica, for example, on the outside of which is formed a mosaic of minute particles 15*a* of a suitable photosensitive material such as cesiated silver, for example. The inside surface of the support 14*a* is covered by a thin conducting film 16*a*. The cylindrical mosaic 14 is supported on a shaft 15 having a disc-like member 16 at one end thereof and a pole shaped member 22 at the other end thereof, both mounted for free rotation in the cylindrical portions 12 and 13, respectively, of the tube 10. As shown in the drawing, the envelope 10 is made of glass or other suitable material and affords a viewing window adjacent the mosaic 14.

The tube 10 is also provided with a portion 17 extending outwardly from the central portion 11, at the end of which is mounted a conventional electron gun 18. The electron gun is a well known device and it will not be necessary to include a detailed description thereof herein. A conducting collector ring 19 is mounted between the surface of the cylindrical mosaic 14 and the electron gun 18 as in the conventional iconoscope tube, and it is provided with a suitable connection 20 extending through the wall of the central portion 11 to the outside of the tube. Also, the rear conducting coating 16*a* on the cylindrical mosaic 14 is connected through the shaft 15 to a suitable brush-type connection 21 which passes through the wall of the cylindrical end portion 12 to the outside of the tube 10.

According to the invention, the cylindrical mosaic 14 is adapted to be simultaneously rotated and translated along the longitudinal axis thereof. This may be accomplished in any suitable manner as, for example, by forming the pole shaped member 22 on the end of the shaft 15 out of magnetic material, and providing a cooperating magnetic field structure 23 outside of the cylindrical tube portion 13, as shown. It will be understood that with this construction, the magnetic member 22 will follow accurately the rotational or translatory motions imparted to the magnetic structure 23. The invention is not intended to be limited to the specific form of rotating and translating mechanism shown, since obviously, many suitable types of follow-up mechanisms can be used for this purpose.

The cylindrical mosaic 14 is adapted to receive light from successive elemental areas of a subject to be scanned. While the device may be utilized to scan a wide variety of subjects including original landscapes or other stationary objects, it will be described herein, first, as applied to the scanning of an opaque color photograph 24 (Fig. 1). Also, while any suitable optical scanning system may be employed for directing light to the novel iconoscope tube 10 of the invention, a simple flat bed optical scanning system will be described and shown herein for purposes of illustration.

As shown in Fig. 1, the optical scanning system may comprise a substantially flat object plate 25 which is adapted to carry a colored photograph 24 to be scanned. In the system shown, a small area 26 on the photograph 24 is adapted to be focussed on the mosaic 14 while the scanning motion is imparted to the object plate 25.

The object plate 25 is adapted to be reciprocated relatively rapidly in one direction and to be moved at a slower rate in another direction substantially perpendicular thereto, so that parallel adjacent lines of the photograph 24 are scanned successively. Any suitable means may be employed for imparting this scanning movement to the object plate 25. For example, the object plate 25 may be reciprocated by forming a rack 27 thereon engaging a pinion 28 on a shaft 29 connected to receive an oscillating angular movement from suitable gear box mechanism 30 powered by suitable motive means 31. Simultaneously, the plate 25 may be slowly moved in a direction perpendicular to the reciprocating movement by means of a rack 27′ engaging a pinion 28′ on a spline shaft 29′ which is adapted to receive a relatively slow turning movement from the gear box mechanism 30. The pinion 28′ is mounted for longitudinal movement on the shaft 29′ so as to remain in engagement with the rack 27′ during reciprocation of the plate 25. Similarly, the pinion 28 is slidable longitudinally of the shaft 29 so that the pinion 28 will remain in engagement with the rack 27 as the object plate 25 is being moved by the pinion 28′.

As best shown in Fig. 2, light from the spot 26 on the photograph 24 is dispersed into a color spectrum by an optical system comprising the collimating lenses 32 and 33 and the prism 34. The color spectrum thus formed is focussed on the surface of the cylindrical mosaic 14 and it may comprise, for example, essentially three main zones 35, 36 and 37 corresponding to the primary colors blue, green and red, respectively.

In order to avoid distortion of the image zones 35, 36 and 37 on the cylindrical mosaic 14, it is essential that the latter be translated along its longitudinal axis and simultaneously rotated in synchronism with the lateral and longitudinal movements, respectively, of the object plate 25. Rotation of the mosaic 14 may be accomplished by forming a ring gear 70 on the magnetic structure 23, engaging a pinion 71 on a spline shaft 72 driven in proportion to the rotation of the shaft 29′.

Translation of the mosaic 14 may be effected by forming a flange 73 on the magnetic structure 23 which is adapted to be received in a groove 74 in a slide 75. Formed on the slide 75 is a rack 76 engaging a pinion 77 on a shaft 78 which is adapted to be driven in proportion to the oscillating angular movement of the shaft 29. It will be understood that the pinion 71 slides on the shaft 72 so as to remain engaged with the ring gear 70 during the reciprocation thereof.

Also, the flange 73 slides freely in the groove 74 as the slide 75 is being reciprocated.

In operation of the scanning system described above, the object plate 25 is moved to and fro at a relatively rapid rate by the rack 27 and pinion 28. At the same time it is moved perpendicularly to the reciprocating movement at a slower rate by the rack 27′ and pinion 28′, so that the photograph 24 is scanned in parallel adjacent lines. As each line on the photograph 24 is scanned in this manner, light from successive elemental areas comprising the scanning line is transmitted through the dispersing system comprising the lenses 32 and 33 and the prism 34 to form a color spectrum on the cylindrical mosaic 14.

Meanwhile, the cylindrical mosaic is being rotated and moved longitudinally in synchronism with the unidirectional and reciprocating movements, respectively, of the object plate 25. As a result, the three image zones 35, 36 and 37 comprising the three primary colors blue, green and red, respectively, are stationary with respect to the mosaic 14, and successive image zones impinging thereupon form substantially parallel lines 38, 39 and 40 on its surface. The image lines thus formed are adapted to be scanned by an electron beam 41 from the electron gun 18 which is periodically swept across the three electron image lines 38, 39 and 40 at a relatively rapid rate. To this end, the vertical deflecting plates 43 of the electron gun 18 may be connected to receive a suitable saw-tooth wave form from a suitable sweep generator 42 (Fig. 3) through the conduit 44. If desired, the return trace may be blanked out in any suitable manner.

The electrical output of the iconoscope tube 10 is impressed upon a resistor 45 (Fig. 3) which is connected by the conductors 46 and 47 to the connections 20 and 21, respectively (Fig. 1). It will be apparent that each time the electron beam 41 traverses the electron image lines 38, 39 and 40, a plurality of pulses are produced corresponding to the several color components represented in the color spectrum comprising the scanning light beam from the photograph 24. The signals representing the color components blue, green and red are plotted as a function of time in the graph 48 of Fig. 4. As there shown, the pulses 49, 50 and 51 representing the blue, green and red components scanned in one traverse of the electron image lines 38, 39 and 40 by the electron scanning beam 41 are displaced in time with respect to each other.

The voltage output appearing across the resistor 45 may be amplified by a conventional single stage electron tube amplifier 52, the output of which may be supplied to a conventional cathode follower 53. In order to separate the blue, green and red signals from one another, the successive color signals are fed selectively into three electrical channels, any suitable commutator type mechanism being employed for this purpose.

For example, the output from the cathode follower 53 may be fed from the cathode resistor 54 thereof to the input terminals of three conventional pulse amplifiers 55, 56 and 57 connected in the red, green and blue channels 58, 59 and 60, respectively. The amplifiers 55, 56 and 57 are adapted to be rendered conducting only when red, green or blue signals, respectively, are supplied to their input terminals. This may be accomplished by a conventional gating circuit 61 which is actuated from the sweep generator 42 through a conduit 62 and which blocks the amplifiers 55, 56 and 57, except when red, green or blue signals, respectively, are being supplied to the inputs thereof. The output of the gating circuit 61 may be a sequence of pulses 61′ as shown in the graph 62 of Fig. 4.

Figure 4:
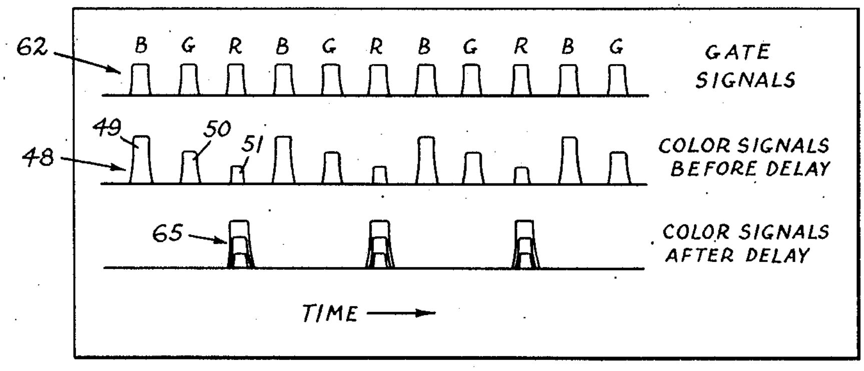
Fig. 4 is a graph on which are plotted typical curves illustrating the signals developed in the several parts of the circuit shown in Fig. 3.

Since there is a time delay between the signals 49, 50 and 51 (Fig. 4) corresponding to the blue, green and red signals, suitable delay networks 63 and 64 should be inserted in the channels 59 and 60, respectively, for the purpose of delaying the green and blue signals, respectively, sufficiently to bring them into phase with the red signals, as shown in the graph 65 of Fig. 4. The outputs of the three channels may then be amplified in suitable amplifiers 66, 67 and 68 and utilized in conventional color correction circuits, for example, for producing properly corrected color separation negatives to be used in color reproduction processes.

By way of example, if each of the electron image lines 38, 39 and 40 is assumed to have 2,000 elements, then 6,000 elemental areas will be scanned during each translation of the cylindrical mosaic 14. Therefore, the ratio of charge to discharge time for each element of the mosaic 14 will be about 6,000 to one and the signal output, theoretically, at least, should be 6,000 times as great as it would be for instantaneous scanning. Since the efficiency of the iconoscope is inherently low, actually the signal may be only about 600 times that obtainable with instantaneous scanning. Even so, it will be apparent that the signals obtained will be substantially free of noise. By virtue of this novel construction, therefore, satisfactory signal-to-noise ratios can be secured from subjects that cannot now be scanned with existing equipment on account of the relatively low intensity of illumination present.

Figure 5:
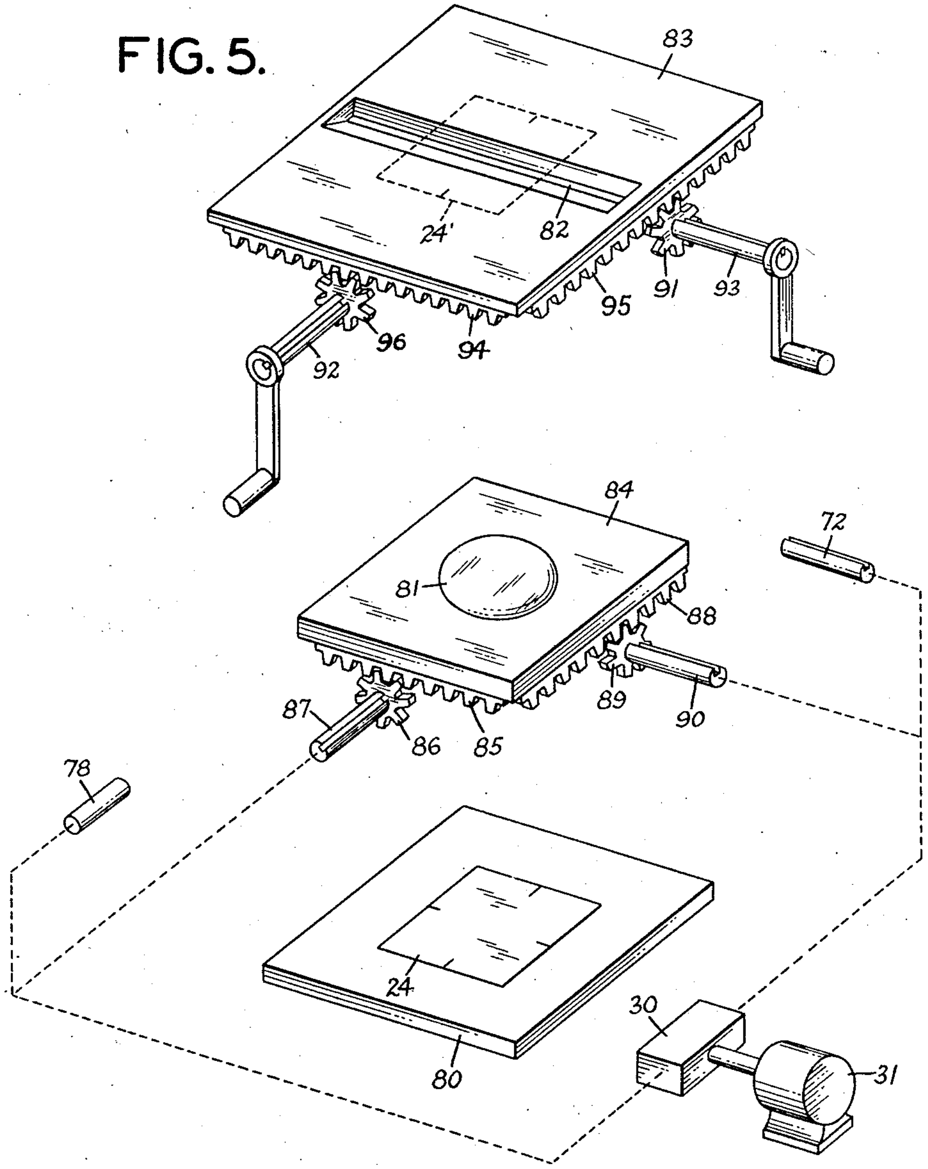
Fig. 5 illustrates schematically a modified form of optical scanning system according to the invention.

Fig. 5 illustrates a modified form of optical scanning system constructed according to the invention. In this embodiment, the object 24 to be scanned is mounted upon a stationary plate 80 and an image 24′ of the object 24 is formed, by a lens system 81, in the plane of a knife-edge slit 82 formed in an opaque plate 83. The portion of the image 24′ within the slit 82 is dispersed into a color spectrum and focussed on the mosaic 14 by an optical system (not shown) similar to that shown in Fig. 2.

Optical line-by-line scanning of the object 24 is effected by imparting suitable scanning motions to the lens board 84 in which the lens system 81 is mounted. Reciprocation of the lens board 84 may be effected by means of a rack 85 formed thereon engaging a pinion 86 mounted on a spline shaft 87 which may be connected to receive an oscillating angular movement from the gear box mechanism 30. Longitudinal movement of the lens board 84 in a direction perpendicular to the reciprocating movement thereof may be effected by a rack 88 engaging a pinion 89 mounted on a spline shaft 90 which is connected to receive a relatively slow, continuous rotating movement from the gear box 30.

As in the form of the invention shown in Fig. 1, the shafts 78 and 72 for moving the cylindrical mosaic 14 in the tube 10 should be connected to receive outputs proportional to those supplied to the shafts 87 and 90, respectively. It will be understood that with this construction the cylindrical mosaic 14 is translated and rotated in proportion to the reciprocating and longitudinal movements, respectively, of the lens board 84. By selecting proper gear ratios and by suitably designing the optical system, the image 24′ focussed on the mosaic 14, of the image in the plane of the slit 82, remains stationary with respect to the mosaic 14.

The purpose of the slit 82 is to permit only a single elemental line of the image 24′ focussed in the plane thereof to be imaged on the mosaic 14 at any instant. Preferably, the length of the slit 82 should be made more than twice the parallel dimension of the image 24′ focussed in the plane thereof. With this construction, it is not necessary to move the opaque plate 83 as the image 24′ is moved by the lens 81.

If desired, suitable racks 94 and 95 may be formed on the plate 83, adapted for engagement with corresponding pinions 96 and 91, respectively, mounted on crankshafts 92 and 93, respectively, by means of which the position of the slit 82 may be adjusted.

Figure 3:
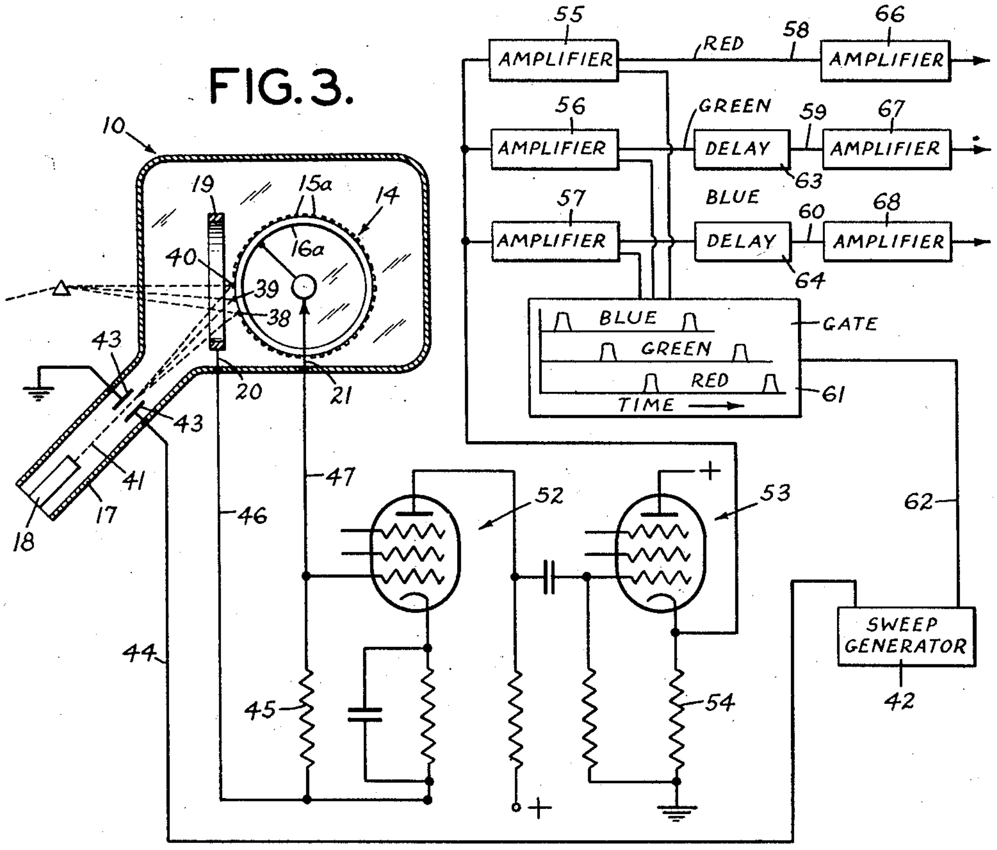
Fig. 3 is a schematic diagram of an electronic circuit adapted to be used with the scanning apparatus shown in Fig. 1.
Figure 6:
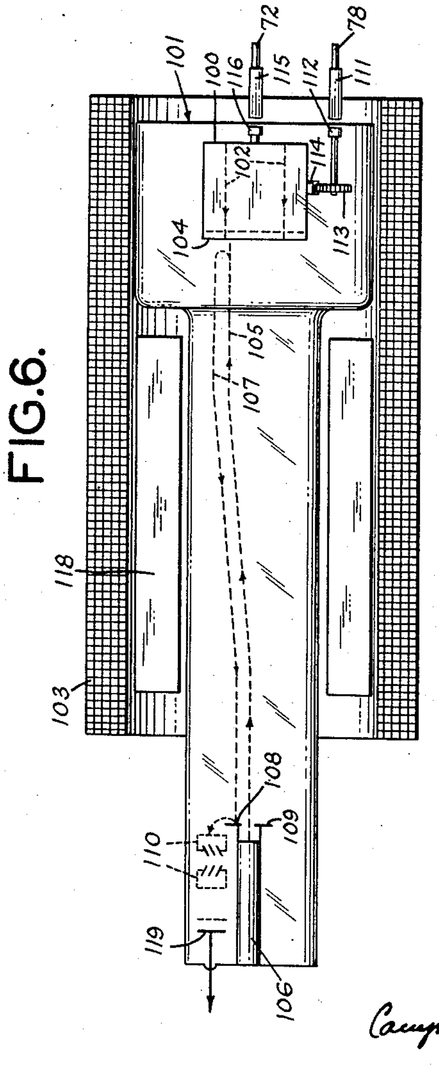
Fig. 6 is a schematic diagram of another embodiment using an image orthicon type tube.

Instead of using an iconoscope type tube as shown in Figs. 1 and 3, a so-called "image orthicon" type of tube might be employed, as illustrated in Fig. 6. In such case, the beam of light from the prism 34 (Fig. 2) would be caused to fall on the photocathode 100 of the image orthicon tube 101 (Fig. 6). As is known, the back of the photocathode 100 emits electrons along the paths 102, in accordance with the light variations on the surface thereon. The electron paths 102 are maintained substantially parallel by an axial magnetic field established by suitably energized focussing coil means 103. The electrons passing over the paths 102 impinge upon a thin target plate 104 made of suitable dielectric material and cause charges to appear on the back thereof which are almost identical to those on the front side. The rear face of the target plate 104 is scanned by an electron beam 105 from a conventional electron gun 106.

Where there is a deficiency of electrons on the target plate 104, electrons are absorbed from the beam 105 to neutralize the deficiency. If there is no deficiency, the electrons in the beam 105 are repelled and travel back towards the electron gun 106 along the path 107. However, instead of returning to the electron gun 106 through the aperture 108 in the disc 109, the large majority of the returning electrons strike the disc 109 and are deflected into an electron multiplier structure 110. It is the variation in the concentration of the electrons in the path 107 that constitutes the picture signal. The signal is amplified in the electron multiplier 110 and the output signal is taken from the anode 119.

Figure 8:
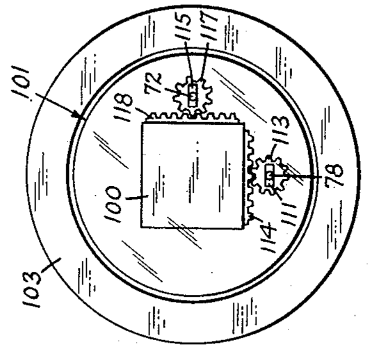
Fig. 8 is a perspective view of a detail of the device shown in Fig. 6.
Figure 7:
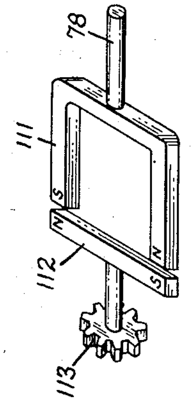
Fig. 7 is an end view of the tube shown in Fig. 6.

In order to insure that the image falling on the photocathode remains stationary with respect to the latter, the photocathode 100 and the target 104 must be given two degrees of motion in a plane, corresponding to the movements of the mechanism employed for optically scanning the subject to be reproduced. This may be accomplished, for example, by connecting the shaft 73 (Fig. 1) to a U-shaped magnet 111 (Figs. 6–8) mounted in cooperating relation to a suitable bar magnet 112 within the tube 101. The bar magnet 112 is mounted on a pinion 113 engaging a rack 114 formed on one side of the photocathode structure and causes the latter to be moved in one direction as a function of the corresponding scanning movement imparted to the object plate 25 (Fig. 1).

Similarly, the shaft 72 (Fig. 1) may be connected to another U-shaped magnet 115 (Fig. 6) like the magnet 111. The magnet 115 is mounted in cooperating relation with a bar magnet 116 within the tube 101 which carries a pinion 117 engaging a rack 118 formed on another side of the photocathode structure. Any suitable means may be employed for maintaining the magnet 115 in operative relation with the bar magnet 116, and the pinion 117 in engagement with the rack 118 as the photocathode structure is moved to different positions by the pinion 113 and the rack 114.

Deflection of the electron beam transversely of the image lines formed on the target plate 104 may be effected by connecting the deflecting yoke 118 to the sweep generator 42 of Fig. 3. The circuit shown in Fig. 3 may be employed by connecting the electron multiplier anode 119 (Fig. 6) to the resistor 45 by the conductor 47. The manner of operation of this embodiment will be evident from the foregoing description.

It is also possible to employ an image dissector type tube in place of the iconoscope 10. In this embodiment, means of the type described above should be provided for imparting to the photocathode surface of the tube movements corresponding to the movements of the optical scanning mechanism employed. This form of the invention does not have as high a signal-to-noise ratio as the two preceding embodiments and the latter are preferred.

It will be understood that the relation between the length of the color spectrum and the diameter of the cylindrical mosaic 14 has been somewhat exaggerated in the drawings. Actually, the length of the spectrum will be so small in terms of cylinder diameter that the portion of the mosaic utilized can be considered essentially flat.

It will be further understood that the specific form of the invention described above and illustrated in the drawings is susceptible of numerous modifications in form and detail within the spirit of the invention. For example, a wide variety of different mechanisms may be employed for imparting translatory and rotational movements to the moving members within the tube. Also, a number of different forms of mechanisms may be utilized for causing the moving members within the tube to move in synchronism with the object plate 25. In addition, other suitable optical scanning systems may be employed and the electronic circuits shown by way of illustration may be modified considerably as will be apparent to those skilled in the art. The specific embodiments described herein and illustrated in the drawings are not intended, therefore, to impose any limitations whatsoever upon the scope of the following claims.

I claim:

1. In an electronic device, the combination of an envelope having a viewing window formed therein, a photosensitive element movably mounted in said envelope and adapted to receive radiant energy transmitted through said window thereto, first means external to said envelope for moving said element in the envelope in a first direction, and second means external to said envelope and independent of said first means for moving said element in the envelope in a second direction.

2. In an electronic device, the combination of an envelope having a viewing window formed therein, a photosensitive element movably mounted in said envelope and adapted to receive radiant energy transmitted through said window thereto, means external to said envelope for rotating said element in the envelope, and means external to said envelope and operable independently of rotational movement of said element by said means for rotating the element for translating said element in the envelope.

3. In an electronic device, the combination of an envelope having a viewing window formed therein, a substantially cylindrical photosensitive element mounted both for rotation and translation in said envelope, and magnetic means having cooperating elements inside and outside said envelope for rotating and translating said element, said elements outside said envelope comprising a first member, means for rotating said first member, a second member movable in translation, and means independent of said means for rotating the first member for moving the second member in translation.

4. In an iconoscope, the combination of an evacuated envelope, a substantially cylindrical photosensitive mosaic mounted for rotation and translation in said envelope, and magnetic means having cooperating parts inside and outside said envelope for rotating and translating said mosaic, said cooperating parts outside said envelope comprising a magnetic member mounted for both rotation and translation, means for rotating said member, and means independent of said means for rotating the member for moving the member in translation.

5. In a system for scanning a colored subject, the combination of optical mechanism for scanning successive elemental areas of the subject, an optical system for dispersing light from successively scanned elemental areas of the subject, an electronic photosensitive element mounted to receive light dispersed by said optical system, said dispersed light impinging on said element to establish simultaneously a plurality of mutually independent photoelectronic reactions, electronic means for scanning said element to provide a plurality of electrical signals representative of color components in the subject, and means for moving said element in predetermined relation to the scanning function performed by said optical mechanism, thereby to maintain the dispersed light received by said photosensitive element substantially stationary with respect to the photosensitive element.

6. In a system for scanning a colored subject, the combination of optical mechanism for scanning successive elemental areas of the subject, an optical system for separating light from successively scanned elemental areas of the subject into a plurality of color components, an envelope having a window therein, a photosensitive mosaic movably mounted in said envelope and adapted to receive said color components to establish simultaneously a plurality of photoelectronic reactions each indicative of a color component in an elemental area of the subject, means for moving said mosaic in predetermined relation to the scanning function performed by said optical mechanism, and electronic means for scanning portions of said mosaic that have been influenced by said color components, thereby to provide a plurality of electrical signals representative of color components as derived from an elemental area of the subject by the optical system.

7. In a system for scanning a colored subject, the combination of optical mechanism including means movable in two different directions for scanning successive elemental areas of the subject, an optical system for separating light from successively scanned elemental areas of the subject into a plurality of color components, an envelope having a window therein, a photosensitive mosaic movably mounted in said envelope and adapted to receive said color components to establish simultaneously a plurality of photoelectronic reactions each representative of a color component in an elemental area of the subject, means for moving said mosaic in two different directions in timed relation to the respective movements of said scanning means in different directions, and electronic means for scanning portions of said mosaic that have been influenced by said color components to provide signals corresponding to said respective color components.

8. In a system for scanning a colored subject, the combination of optical mechanism including means movable in two different directions for scanning successive elemental areas of the subject, an optical system for separating light from successively scanned elemental areas of the subject into a plurality of color components, an envelope having a window therein, a photosensitive mosaic movably mounted in said envelope and adapted to receive said color components to establish simultaneously a plurality of photoelectronic reactions each representative of a color component in an elemental area of the subject, means for moving said mosaic in two different directions in timed relation to the respective movements of said scanning means in different directions, electronic means for scanning portions of said mosaic that have been influenced by said color components to provide signals corresponding to said respective color components, a plurality of channels corresponding, respectively, to said color components, and means rendering each of said channels effective to receive only signals corresponding thereto.

9. In a system for scanning a colored subject, the combination of optical mechanism including means movable in two different directions for scanning successive elemental areas of the subject, an optical system for separating light from successively scanned elemental areas of the subject into a plurality of color components, an envelope having a window therein, a photosensitive mosaic movably mounted in said envelope and adapted to receive said color components to establish simultaneously a plurality of photoelectronic reactions each representative of a color component in an elemental area of the subject, means for moving said mosaic in two different directions in timed relation to the respective movements of said scanning means in different directions, electronic means for scanning portions of said mosaic that have been influenced by said color components to provide signals corresponding to said respective color components, a plurality of channels corresponding, respectively, to said color components, means rendering each of said channels effective to receive only color component signals corresponding thereto, and delay means in certain of said channels for bringing all of said signals in phase.

10. Optical scanning mechanism comprising a support for a subject to be scanned, a member having a relatively narrow slit therein, a lens system for focussing an image of the subject in the plane of said slit, means for producing relative reciprocating movement between said lens system and said support, and means for producing a slower relative motion between said lens system and said support at an angle to said reciprocating movement, whereby successive elemental areas of a subject may be scanned.

11. In an electronic device, the combination of an envelope having a viewing window formed therein, a photocathode within said envelope, a target plate of dielectric material in said envelope and spaced apart from said photocathode, and means for moving said photocathode and said target plate with respect to said envelope.

12. In a system for scanning a subject, the combination of optical mechanism for scanning successive elemental areas of the subject, an envelope having a window thereon, a photocathode in said envelope, a target plate of dielectric material in said envelope and spaced apart from said photocathode, means for moving said photocathode and said target plate as a unit in predetermined relation to the scanning function performed by said optical mechanism, thereby to maintain the light received by said photocathode from the subject substantially stationary with respect to the photocathode and electronic scanning means for scanning portions of said target plate that have been influenced by light from said successively scanned elemental areas falling upon said photocathode to provide a succession of electrical signals representative of successive elemental areas of the subject.

BATTLE H. KLYCE.

References Cited in the file of this patent

UNITED STATES PATENTS

| Number | Name | Date |
|---|---|---|
| 1,745,029 | Btcheouloff | Jan. 28, 1930 |
| 2,175,582 | Vogel | Oct. 10, 1939 |
| 2,296,908 | Crosby | Sept. 29, 1942 |
| 2,330,682 | Clothier | Sept. 28, 1943 |
| 2,351,889 | Strubig | June 20, 1944 |
| 2,415,450 | Swann | Feb. 11, 1947 |
| 2,422,778 | Finch | June 24, 1947 |
| 2,422,937 | Szegho | June 24, 1947 |

FOREIGN PATENTS

| Number | Country | Date |
|---|---|---|
| 318,331 | Great Britain | Sept. 5, 1929 |
| 536,720 | Great Britain | May 26, 1941 |